United States Patent [19]
Jones

[11] 3,732,404
[45] May 8, 1973

[54] METER DEVICE

[75] Inventor: Charles L. Jones, West Hartford, Conn.

[73] Assignee: Ripley Company, Inc., Middletown, Conn.

[22] Filed: Sept. 20, 1971

[21] Appl. No.: 181,674

[52] U.S. Cl. ............................235/113, 235/91 R
[51] Int. Cl. ..............................G06c 27/00
[58] Field of Search ..............235/113, 91 R, 91 A, 235/91 G

[56] References Cited

UNITED STATES PATENTS

| 825,208 | 7/1906 | Hanly | 235/91 R |
|---|---|---|---|
| 3,195,814 | 7/1965 | Steinkamp | 235/113 |
| R7,601 | 4/1877 | Squire | 235/113 |
| 410,885 | 9/1889 | Ford | 235/113 |
| 801,205 | 10/1905 | Beal | 235/113 |
| 526,579 | 9/1894 | Tinder | 235/91 R |
| 882,076 | 3/1908 | Nelson | 235/91 R |
| 1,091,326 | 3/1914 | Gabus | 235/113 |

Primary Examiner—Richard B. Wilkinson
Assistant Examiner—Stanley A. Wal
Attorney—Delio and Montgomery

[57] ABSTRACT

A meter device for electrically reading incremental positions wherein the continuous rotation of a drive armature is converted to intermittent incremental rotation by a mechanism including a jumping cam, a lever arm having a cam follower responsive to the cam, a drive pawl member, a check pawl member which prevents forward motion of the ratchet wheel subsequent to each advancement by the drive pawl member, a detent for arresting reverse motion of the ratchet wheel subsequent to each advancement thereof, and including a plurality of wheel assemblies geared to the ratchet wheel and calibrated as to relative rates of rotation for incremental digital encoding.

9 Claims, 9 Drawing Figures

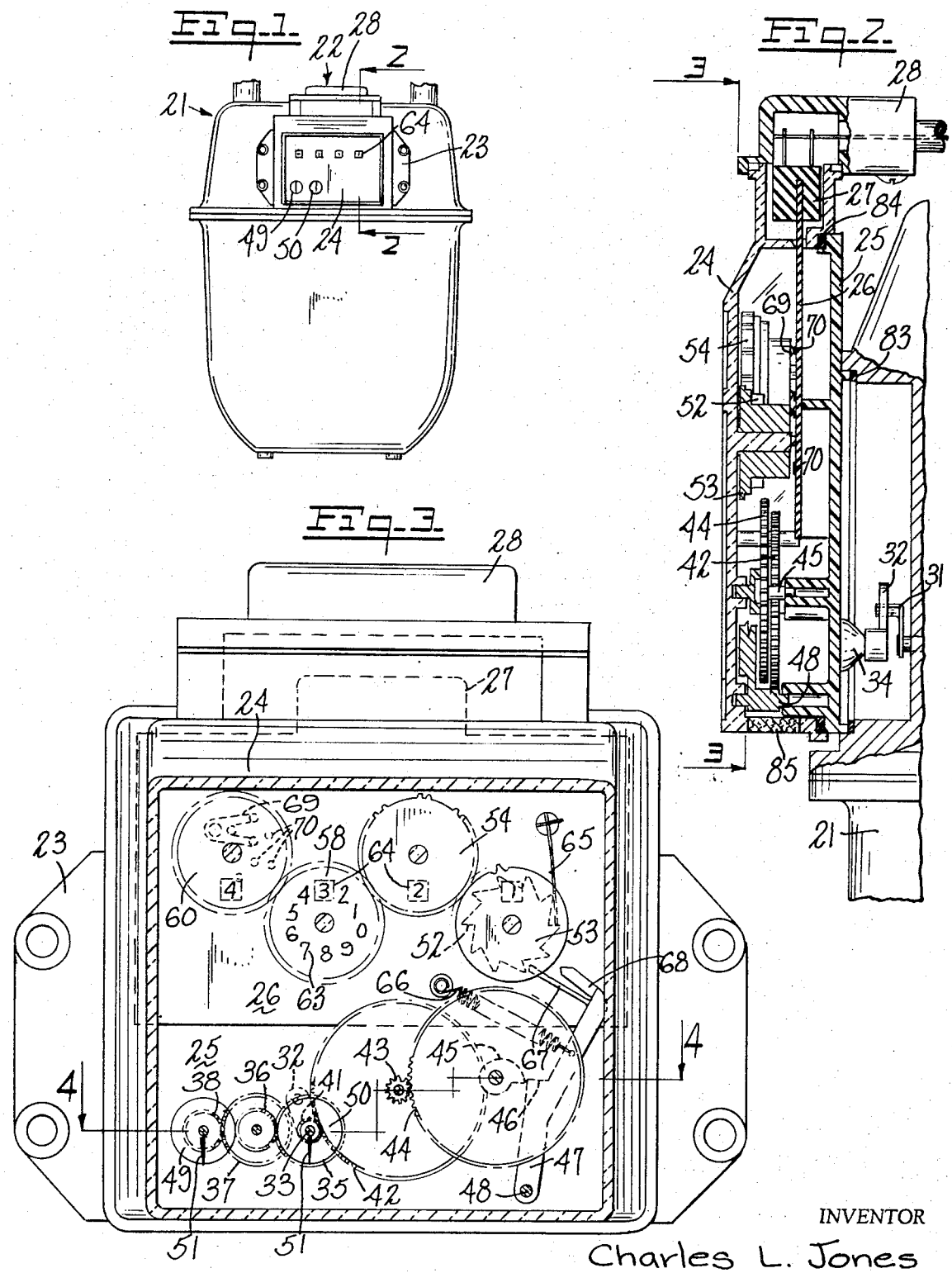

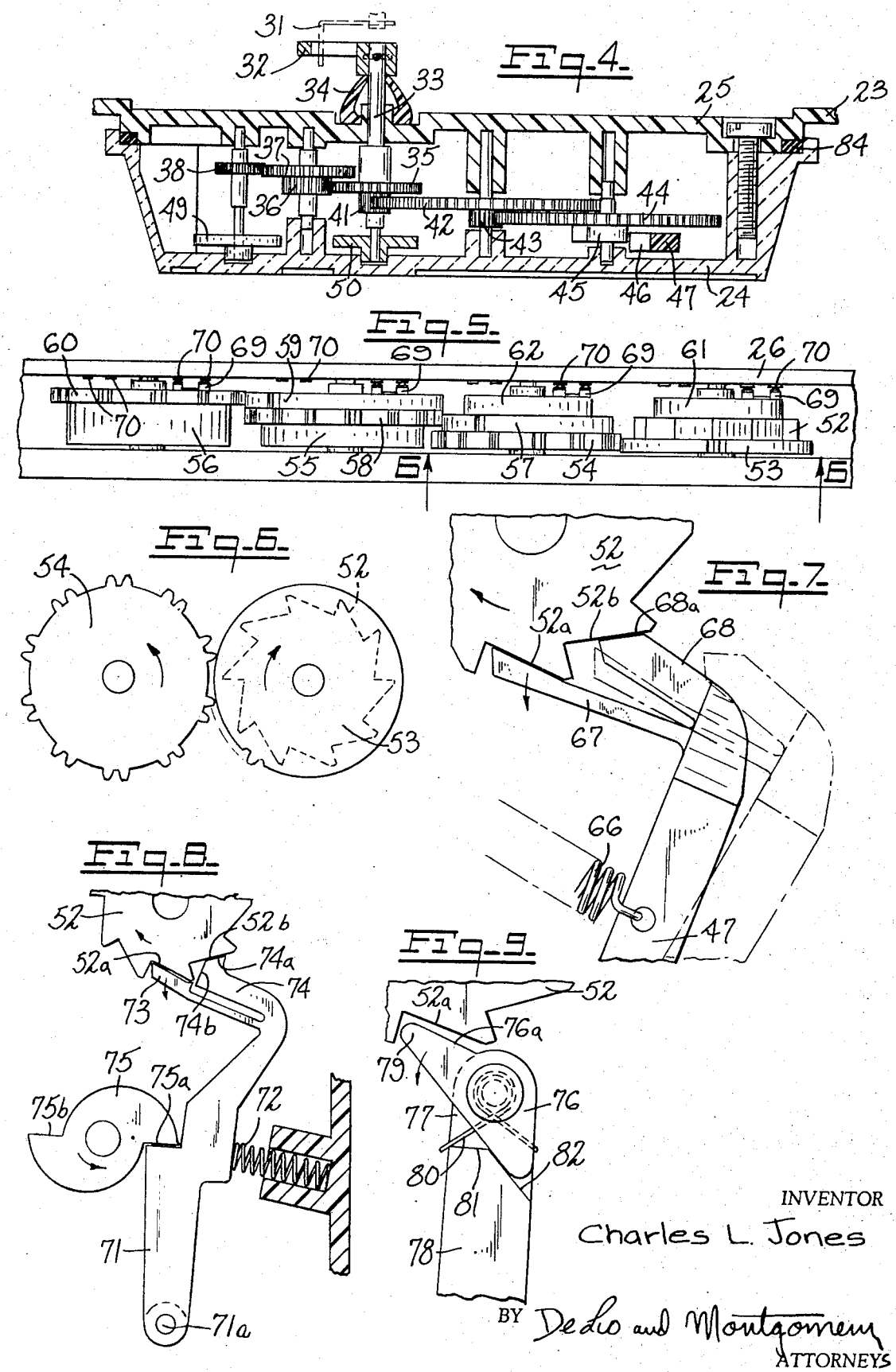

METER DEVICE

BACKGROUND OF THE INVENTION

This invention relates to meter devices and more particularly to meter devices for electrical readout of consumption of gas, water, electrically and the like. Specifically, the invention relates to structure in meter devices for electrically reading incremental positions, which devices are adapted to be used in conjunction with existing meters.

The field of art with which this invention is concerned is represented by U. S. Pat. No. 3,195,814, issued July 20, 1965. The aforementioned patent refers to a problem solved by the present invention by novel structure, namely, the necessity in adequate electrical readout devices of providing means for converting continuous rotation of a drive armature to intermittent incremental rotation. This requirement is based on the fact that electrical readout is most economically and directly achieved by provision of a plurality of pairs of discrete contact points, each pair of points corresponding to a quantum of gas, water or electricity consumed. A contact wiper in some form is used to close each pair of electrical contacts, thereby providing for electrical readout of mechanically encoded data, most beneficially to a connector which is adapted to mate with an external connector. The electrical connector forms a part of a recording device, as noted in the aforementioned patent. Absent the conversion of the continuous rotation of a drive armature to intermittent incremental rotation, the pointers normally present in such meters move continuously rather than from one integer to another on a recording dial.

The present invention in one sense is an improvement upon the meter device of the aforementioned patent in that it achieves substantially the same results but with substantially simplified structure, thereby assuring more accurate results and extended life of the mechanism.

OBJECTS AND SUMMARY

Accordingly, an object of this invention is to provide a new and improved meter device for electrically reading incremental positions.

Another object is to provide new and improved means for converting continuous rotation to intermittent incremental rotation for electrical readout of incremental positions.

Still another object is to provide means for converting existing visually read meters to meters capable of visual or automatic readouts at any time, wherein the readings are always of positive integers.

Still another object of the invention is to provide a new and improved meter device embodying simple and economical structure and mechanism, thereby providing accuracy and long life.

These and other objects, features and advantages of the invention will in part be obvious and will in part be apparent from the specification which follows.

In summary terms, the meter device of the invention includes means for converting continuous rotation to intermittent incremental rotation wherein a jumping cam, responsive to a drive means which itself is responsive to a continuously rotating drive armature, is operatively combined with a lever arm having a cam follower, a drive pawl member reciprocated by the lever arm, a ratchet wheel, and a plurality of wheel assemblies operatively interconnected in a gear train to the ratchet wheel, wherein the wheel assemblies are calibrated as to relative rates of rotation for incremental digital encoding. In another aspect the meter device includes a circuit board having a plurality of sets of electrical contacts spaced thereon for wiping contact with a circuit-closing contact wiper, one of which is associated with each of the wheel assemblies and rotates therewith. A check pawl member preferably is present to arrest forward motion of the ratchet wheel beyond predetermined incremental positions, subsequent to each advancement of the ratchet wheel, and a detent is employed for arresting reverse motion of the ratchet wheel.

The invention accordingly comprises a device possessing the features, properties and the relation of elements which will be exemplified in the device hereinafter described, and the scope of the invention will be indicated in the claims.

DETAILED DESCRIPTION

For a fuller understanding of the nature and objects of the invention, reference is had to the following description taken in conjunction with the accompanying drawings, in which:

FIG. 1 is a front elevational view of a commercially available gas meter assembly modified in accordance with the invention;

FIG. 2 is an enlarged, partially fragmentary, section along the line 2—2 of FIG. 1;

FIG. 3 is an enlarged section along the line 3—3 of FIG. 2 with some portions of underlying structure indicated diagrammatically;

FIG. 4 is a section along the line 4—4 of FIG. 3;

FIG. 5 is an enlarged, partially fragmentary and slightly exploded side view of the upper gear train of FIG. 3;

FIG. 6 is a partially diagrammatic view along the line 6—6 of FIG. 5;

FIG. 7 is an enlarged, diagrammatic view of a portion of the ratchet wheel and pawl mechanism shown in FIG. 3;

FIG. 8 is an enlarged, diagrammatic view of another embodiment of ratchet wheel and pawl mechanism; and FIG. 9 is an enlarged, diagrammatic view of detail of still another embodiment of ratchet wheel and pawl mechanism of the invention.

With reference to FIGS. 1–7, a meter device of the invention, such as a gas meter assembly 21, is shown with a meter reading mechanism 22 of the invention replacing a conventional continuous-type meter while employing a support plate 23 substantially identical to a support plate of a conventional meter. The housing of the meter device of the invention includes a front plate 24 and a rear plate 25, the two plates having suitable spacing structure therebetween. Interior of the housing is an electrical circuit board 26 associated with electrical relay means 27 and an electrical encoder takeoff structure 28 to an external connector and recording device (not shown). Such relay structure, connectors and recording devices are well known, as indicated in U. S. Pat. No. 3,195,814.

A drive armature 31, responsive to consumption of gas drives a crank 32 which turns a shaft 33 protected by a boot seal 34. The shaft 33 drives a gear train which includes a spur gear 35, a pinion 36, additional spur gears 37 and 38, and also a second pinion 41, a spur gear 42, a pinion 43, and a spur gear 44. Thus far the structure is conventional and what might be included in a continuous rotation, pointer and dial type meter.

As shown in greater detail in FIG. 4, appropriate shafts are provided in the gear train, in addition to drive shaft 33, and on one of the shafts is mounted a jumping cam 45. A cam follower surface 46 forms an intermediate portion of a lever arm 47 which is pivoted at one end 48 for reciprocal motion between a cock position and an advancement position, as explained below. Dials 49 and 50 with associated pointers 51 are mounted on ends of several of the shafts in the gear train for visual recording, if desired. In the gear train exemplified in FIGS. 1–7, dials 49 and 50 indicate relatively insignificant quanta, that is, small units which normally are not billed to a customer. However, they may be present for other reasons, for example, to provide a check of operability of the device.

Mounted between the circuit board 26 and front plate 24 are a series of wheel assemblies interconnected in a gear train to a ratchet wheel 52. One of the wheel assemblies, here shown as the first wheel assembly on the right, includes a mono-toothed wheel 53 which is geared to a deca-toothed wheel 54 in the second of the wheel assemblies, as indicated in FIG. 5. The remaining wheel assemblies in the train include face discs 55 and 56, a mono-toothed wheel 57 geared to a deca-toothed wheel 58, and a mono-toothed wheel 59 geared to a deca-toothed wheel 60. Spacer discs 61 and 62 are additional components of the first and second wheel assemblies. It will be evident by the illustrated gearing that the wheel assemblies are geared to provide reduction ratios of 10:1 as between any contiguous pair of the wheel assemblies. However, any other reduction ratio or combination of wheels may be provided as desired in accordance with the digital reading requirements of the utility being metered.

On the faces of the outer members of each wheel assembly, that is, mono-toothed wheel 53, deca-toothed wheel 54, and discs 55 and 56, may be imprinted suitable indicia such as the numerals 63 for visual readout of the meter. The indicia may be totally viewed by circular cutouts in the front plate 24 or they may be individually viewed by discrete windows 64 through the front plate 24.

The mechanism for converting the continuous rotation from the drive crank 32 through the gear train in the lower portion of the meter device to the intermittent incremental motion of the wheel assemblies will be understood by consideration of FIGS. 3–7. With reference thereto, reverse motion of the ratchet wheel 52 is prevented by a detent arm 65. The ratchet wheel 52 moves the mono-toothed wheel 53 which in turn rotates the contiguous wheel assemblies. With reference to FIG. 6, it will be noted that deca-toothed wheel 54 is locked in position until mono-toothed wheel 53 engages one of the teeth of the wheel 54. It thus requires one full revolution of mono-toothed wheel 53 to impart one-tenth revolution to deca-toothed wheel 54. In a like manner, reduction ratios of 10:1 are imparted to the other wheels in the train, so as to incrementally encode digital relationships of this ratio, such as thousands, ten thousands, hundred thousands, and millions of cubic feet of consumed gas. In this connection dials 49 and 50 may be calibrated to indicate tens and hundreds of cubic feet of gas, or the entire encoding system may be scaled lower so as to begin to read at hundredths or tenths of cubic feet, with corresponding increments preferably in factors of ten.

With reference to FIGS. 3 and 7, the lever arm 47 is moved to a cocked position by cam 45 and then snap-advances under the urging of expansion spring 66 when cam follower surface 46 becomes operative. The upper end of lever arm 47 is formed with, or has mounted thereon, a two-pronged pawl assembly comprising a drive pawl member 67 and a check pawl member 68. Drive pawl member 67 is resiliently mounted on lever arm 47 for resilient sliding engagement with a wall 52a of a tooth of the ratchet wheel 52. Since drive pawl member 67 must be sufficiently resilient so that it will clear the tooth of ratchet wheel 52 upon which it rests in a drive position for restoration to a cocked position, it is possible that the ratchet wheel 52 would move forward a small distance. The consequence of such movement would be to throw off the discrete and intermittent contact required for electrical readout.

For a proper understanding of this problem, reference is made to FIGS. 3 and 5 where there are shown U-shaped electrical contact wiper arms 69, one each of which is mounted on the lowermost member of each wheel assembly. The U-shape is primarily a convenience, it being understood that the contact wiper functions to close an electrical circuit which includes each pair of contacts and therefore any other shape of wiper providing this function will be suitable. Arranged on the circuit board above each of the wheel assemblies is a set of electric contacts 70 spaced in concentric pairs and positioned for wiping contact with the U-shaped wiper arm 69 on each of the wheel assemblies. Referring to FIG. 7, if there were no means to prevent continued forward motion of ratchet wheel 52 after advancement by drive pawl member 67, the continued rotation would be transmitted through the wheel assembly gear train with the result that the U-shaped wiper contact arms 69 would not necessarily make electrical contact with a pair of contacts 70 upon each actuation of the drive pawl member. To prevent this forward movement, a check pawl member 68, lacking the resiliency of drive pawl member 67, is positioned for sliding contact of an edge 68a thereof with the wall 52b of the next tooth following the tooth with which drive pawl member 67 is in sliding contact. Due to the rigid construction and mounting of check pawl member 68 on lever arm 47, it reaches a position of coplanar equilibrium or locking engagement of its edge 68a with the wall 52b and thereby prevents further forward motion of ratchet wheel 52.

It will be evident that the dimensions of each of the pawl members 67 and 68, relative to each other as well as to ratchet wheel 52, are important so as to provide the functions described. In general, drive pawl member 67 is resiliently mounted on lever arm 47 whereas check pawl member 68 is rigidly mounted, the latter member being positioned to provide a check on forward motion of the ratchet wheel beyond a predetermined distance but not a driving function.

Another embodiment of ratchet wheel and pawl arrangement is shown in FIG. 8. Here a lever arm 71, similarly pivoted at one end thereof as at 71a, is urged by a compression spring 72 so as to advance a drive pawl member 73 against a tooth of ratchet wheel 52. Integral with lever arm 71 and positioned above drive pawl member 73 is a check pawl member 74 providing a sliding and locking edge 74a similar to edge 68a of check pawl member 68 in FIG. 7. The jumping cam may have a single operative cam surface, like cam 45, but may also comprise a cam 75 having two surfaces 75a and 75b, as shown in FIG. 8. The dual cam 75 of course doubles the rate of intermittent motion imparted to the wheel assemblies, given the same set of gears which are continuously driven in the lower portion of the meter device, as depicted in FIGS. 3 and 4. The same effect can be achieved with a cam having a single cam surface if, in FIGS. 3 and 4, spur gear 42 is replaced with a spur gear having half the circumference of spur gear 42. This variation, of course, is not critical but is representative of the modifications to which the invention is susceptible without departing from the spirit thereof.

Returning to FIG. 8, it will be noted that check pawl member 74 is provided with a second edge 74b. This edge enhances the functioning of the check pawl member in that, by providing an abutment for the tooth defined by wall 52a, especially if there should be some lateral bending of drive pawl member 73 during advancement, it helps to stabilize the positioning and contact of edge 74a with wall 52b, and to lock edge 74a into engagement with wall 52b. In other respects, the combined operation of drive pawl member 73 and check pawl member 74 is substantially equivalent to that of the structure depicted in FIG. 7.

In still another embodiment of drive pawl and check pawl assembly, as shown in FIG. 9, as elongated member 76 is pivoted between its ends and at one end 77 of a lever arm 78. The lever arm 78 reciprocates in response to a cam as in the embodiments of FIGS. 1–8. The finger-like projecting end 79 of elongated member 76 thus constitutes a drive pawl for actuation of ratchet wheel 52. Simultaneously with contact of end 79 with a tooth of ratchet wheel 52, the edge 76a of the elongated member 76, which is adjacent end 79, comes into coplanar engagement with a wall 52a of a tooth of the ratchet wheel, thereby preventing further advance of the ratchet wheel. The edge 76a thus defines a check pawl member having a function substantially equivalent to that of check pawl members 68 and 74 of FIGS. 7 and 8, respectively. It will be evident that a detent 65, while not shown in FIG. 9, may be utilized with the mechanism of FIG. 9 to prevent reverse motion of ratchet wheel 52, as previously explained.

With reference to FIG. 9, a spring 80 tensioned against an edge 81 of lever arm 78 positions the end 79 of elongated member 76 for driving contact with ratchet wheel 52, and a second edge 82 of lever arm 78 provides a detent for limiting the pivot of the elongated member 76. After advancement of the ratchet wheel, when the associated cam again begins to restore lever arm 78 to a cock position, the elongated member 76 pivots in the direction of the arrow, thus permitting the edge 76a to slide out of locking engagement with ratchet wheel 52a and to snap into the groove defined by the wall of the next adjacent tooth. The elongated member 76 is thus readied for the next advancement induced by the cam mechanism.

As evident in FIGS. 2 and 4, the housing of the device 21 may also include a gasket 83 for sealing the rear plate 25 to existing support plate 23, and a second gasket 84 for sealing front plate 24 to rear plate 25 and an associated electrical relay structure. A fiber-filled aperture 85 is provided in a side wall of front plate 24 for venting of gases which may escape past armature 31 from the interior of the meter. The front plate 24 may be fastened to the rear plate 25 by any suitable means, such as by screw 86.

In operation, with reference to FIGS. 1–7, the armature 31 continuously rotates crank 32, this drive being communicated through the lower gear train which includes the spur gear 44 and jumping cam 45. The cam 45 urges the lever arm 47 to a cock position, then actuates drive pawl member 73 and check pawl member 74 in the manner already described. The intermittent incremental advancement of ratchet wheel 52 imparts the same motion to the train of wheel assemblies which are reduction geared to provide the desired digital encoding. In a gas meter application of the meter device of the invention, as shown, the wheel assembly which is driven by ratchet wheel 52 carries a mono-toothed wheel 53, and the remaining wheel assemblies include mono-toothed and deca-toothed wheels so geared together as to provide reduction ratios of 10:1 between any contiguous wheel assemblies. The contact wiper 69 included in each wheel assembly then intermittently and incrementally closes the circuits defined by the sets of contacts 70 which are circularly-positioned on the circuit board 26, in a sequence timed for electrical readout of the incremental, digital encoding provided by the intermittent rotation of the wheel assemblies. If desired, each wheel assembly may include suitable indicia, such as the digits 63, for visible readout through windows 64, as well.

It will thus be seen that the objects set forth above, among those made apparent from the preceding description, are efficiently attained and, since certain changes may be made in the above device without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a meter device for electrically reading incremental positions, means for converting continuous rotation to intermittent incremental rotation comprising:
   a first shaft,
   drive means for driving said shaft,
   a jumping cam mounted on said shaft,
   a lever arm carrying a cam follower responsive to said cam,
   a drive pawl member responsive to reciprocation of said lever arm,
   a second shaft,
   a ratchet wheel mounted on said second shaft and responsive to said drive pawl, a plurality of wheel assemblies operatively interconnected and calibrated as to relative rates of rotation for incremental digital encoding, one of said wheel assemblies being driven by said ratchet wheel, a check pawl member adapted to arrest forward motion of said ratchet wheel beyond a predetermined incremental position subsequent to each advancement of said ratchet wheel, and a detent for arresting reverse motion of said ratchet wheel subsequent to each advancement thereof, and wherein said pawl members are integral with said lever arm.

2. A device as in claim 1 including a circuit board carrying a plurality of sets of electrical contacts spaced thereon, each said set of contacts comprising a plurality of pairs of contacts concentrically arranged, each said pair corresponding to a digit of said incremental digital encoding, and an electrical contact wiper on each of said wheel assemblies adapted for wiping contact with said pairs of contacts.

3. A device as in claim 1 wherein said drive pawl member is resiliently mounted on said lever arm and is adapted for resilient sliding release from said ratchet wheel, and wherein said check pawl member is rigidly mounted on said lever arm and includes a first edge adapted for coplanar engagement with a surface of a tooth of said ratchet wheel after advancement of said ratchet wheel, thereby preventing said further advance of said ratchet wheel.

4. A device as in claim 3 wherein said check pawl member includes a second edge adapted to abut a tooth of said ratchet wheel subsequent to each incremental advancement thereof, thereby stabilizing said coplanar engagement.

5. A device as in claim 3 wherein said pawl members comprise separate projections unitary with said lever arm.

6. A device as in claim 1 wherein said drive pawl member comprises a first end of an elongated member, said elongated member being pivotally connected at a point between the ends thereof to said lever arm and adapted to reciprocate between operative and release positions of said pawl members, and said check pawl member comprises an edge of said elongated member adjacent said first end, said edge being adapted for coplanar engagement with a wall of a tooth of said ratchet wheel after advancement of said ratchet wheel, thereby preventing said further advance of said ratchet wheel.

7. A device as in claim 6 including spring means for urging said pawl members into operative contact with said ratchet wheel, and wherein said lever arm includes a detent defining the limit of said operative position of said elongated member under the urging of said spring means.

8. A device as in claim 1 wherein said jumping cam has a single cam surface.

9. A device as in claim 1 wherein said jumping cam has a double cam surface.

* * * * *